US006463036B2

(12) United States Patent
Nakamura et al.

(10) Patent No.: US 6,463,036 B2
(45) Date of Patent: *Oct. 8, 2002

(54) ATM COMMUNICATION APPARATUS AND METHOD OF CONTROLLING CONGESTION IN A COMMUNICATION NETWORK USING THE ATM COMMUNICATION APPARATUS

(75) Inventors: Ryo Nakamura, Yokohama; Kazuhiro Watanabe, Kanagawa-ken, both of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/778,101

(22) Filed: Jan. 2, 1997

(65) Prior Publication Data

US 2001/0012269 A1 Aug. 9, 2001

(30) Foreign Application Priority Data

Jan. 11, 1996 (JP) .............................. 8-002863

(51) Int. Cl.[7] .......................... G01R 31/08; H04L 12/28
(52) U.S. Cl. .............................. 370/236.1; 370/395.21; 370/410
(58) Field of Search .............................. 370/235, 236.1, 370/237, 395.21, 396, 397, 232, 231, 229, 230, 389, 388, 392, 400, 233, 234, 410, 411, 412, 413

(56) References Cited

U.S. PATENT DOCUMENTS

| | | | | |
|---|---|---|---|---|
| 5,090,011 A | * | 2/1992 | Fukuta et al. ............... | 370/230 |
| 5,457,687 A | * | 10/1995 | Newman ..................... | 370/232 |
| 5,515,359 A | * | 5/1996 | Zheng ........................ | 370/13 |
| 5,701,292 A | * | 12/1997 | Chiussi et al. .............. | 370/232 |
| 5,704,047 A | * | 12/1997 | Schneeberger .............. | 370/229 |
| 5,729,530 A | * | 3/1998 | Kawaguchi et al. ......... | 370/236 |
| 5,737,314 A | * | 4/1998 | Hatono et al. ............... | 370/235 |
| 5,745,477 A | * | 4/1998 | Zheng et al. ................ | 370/230 |
| 5,754,530 A | * | 5/1998 | Awdeh et al. ............... | 370/232 |
| 5,777,984 A | * | 7/1998 | Gun et al. ................... | 370/230 |
| 5,787,071 A | * | 7/1998 | Basso et al. ................ | 370/231 |
| 5,787,073 A | * | 7/1998 | Ikeda ......................... | 370/236 |
| 5,838,677 A | * | 11/1998 | Kozaki et al. ............... | 370/235 |
| 5,901,140 A | * | 5/1999 | Van As et al. ............... | 370/236 |
| 5,923,645 A | * | 7/1999 | Okuda et al. ................ | 370/232 |
| 6,144,636 A | * | 11/2000 | Aimoto et al. .............. | 370/229 |

FOREIGN PATENT DOCUMENTS

JP        7183886        7/1995

* cited by examiner

Primary Examiner—Kwang Bin Yao
Assistant Examiner—Hanh Nguyen
(74) Attorney, Agent, or Firm—Antonelli, Terry, Stout & Kraus, LLP

(57) ABSTRACT

An ATM communication apparatus excellent in reliability and economical efficiency and capable of performing congestion control at a high speed in an asynchronous transfer mode (ATM) communication network. For this purpose, there are provided in the ATM communication apparatus a mechanism for identifying a cell transmitting origin that has caused a congestion when the congestion is detected in a communication node and a mechanism for newly generating a congestion notifying RM cell and transmitting it directly to the cell transmitting origin, and there is provided a congestion control function for generating and sending an RM cell immediately to a communication terminal or a communication apparatus that is transmitting a cell which causes the congestion within a communication apparatus having a congestion cell buffer at the time of generation of a congestion of a cell buffer within the node. A communication network is structured of this ATM communication apparatus, and, at the time of a congestion state of a communication apparatus, the response period of time required from a communication terminal or a communication apparatus which is transmitting a cell which causes a congestion receives an RM cell until the cell transmission speed is lowered is shortened. Thus, the quantity of cell buffers provided in a communication apparatus is reduced.

9 Claims, 11 Drawing Sheets

ATM COMMUNICATION APPARATUS AND METHOD OF CONTROLLING CONGESTION IN A COMMUNICATION NETWORK USING THE ATM COMMUNICATION APPARATUS

BACKGROUND OF THE INVENTION

1. Field of the Invention

The present invention relates to an ATM communication apparatus in an ATM communication network, and more particularly to an ATM communication apparatus suitable for controlling congestion in a communication network and a method of controlling a communication network using the ATM communication apparatus.

2. Description of the Related Art

As a conventional processing method of Enhanced Proportional Rate Control Algorithm (EPRCA) set forth in ATM Forum/94-0438R2 "Closed-Loop Rate-Based Traffic Management" is known.

In this method, congestion detected in a network is notified to a communication apparatus using a resource management cell (RM cell), thereby to perform traffic control such as lowering a cell transmission speed so that the communication apparatus may evade the congestion. To be concrete, in this method, when a communication apparatus of a transmitting origin of a cell also sends out RM cells at appropriate intervals in addition to normal sending out of user cells for transmitting/receiving information among users, in case a congestion is generated in a certain apparatus in the network where the user cells pass therethrough, the congestion is notified to a communication terminal or a communication apparatus that is transmitting a user cell causing the congestion so as to perform such traffic control that the cell transmission speed is lowered in order to evade the congestion in the communication network by transmitting by return the RM cell to the apparatus of a transmitting origin after adding congestion information to the RM cell at a terminal point (a receiving side apparatus of the user cell) when the RM cell also passes through the apparatus and transmitted once to the terminal point together with the user cell, and a transmission band is utilized effectively while evading deterioration of the communication quality caused by the congestion in the network by controlling the cell transmission speed of the user cell sending origin.

Further, as another method of controlling a congestion, there is a method, such as disclosed in JP-A-7-183886, of lowering or suspending the cell transmission speed by notifying the communication apparatus that has transmitted the cell at a previous stage directly of generation of a congestion when the communication apparatus monitors a buffer provided on an input circuit side and detects the congestion. According to this method, since notification of a congestion ia made higher in speed and the quantity of cells inputted to the apparatus is controlled immediately, it is possible to evade a congestion even if the quantity of input buffers in the apparatus is small.

In the former among the methods of controlling ATM congestion described above, such operation is performed that RM cells inserted into a user cell flow at a fixed period are transmitted once to a receiving terminal or a communication apparatus which is an RM cell terminal point, congestion information is added to these RM cells and returned to an RM cell transmission terminal or a communication apparatus so as to detect the congestion information of the RM cells during the period from the time when a certain apparatus in the network falls into a congestion state to the time when the cell transmission speed in the user cell transmitting origin is lowered in order to evade the congestion. Thus, the congestion state is continued during that period. Namely, during the period until the communication apparatus of the transmitting origin starts traffic control, such a danger that the cells overflow and are lost (generation of cell discard) at a cell buffer for exchanging cells or the like is incurred. In order to evade such a phenomenon, it has been required to prepare a large quantity of cell buffers in a communication apparatus in a network so that cell discard is not generated in cell buffers even when the response time until the user cell transmission speed in an RM cell transmitting terminal or communication apparatus is lowered is long. The necessity for increasing buffers becomes more and more conspicuous when the network becomes large in scale, the communication apparatus is connected in multistages and propagation delay is increased (the response time gets longer), or the number of circuits to be processed is increased and the quantity of cells inputted to a communication apparatus is increased.

On the other hand, although the latter method for making congestion control higher in speed solves reduction of buffer quantity which is the subject in the former, it is not structured so as to investigate a transmitting origin in case a congestion is generated as a result that cells are inputted from a plurality of transmitting origins and to notify the transmitting origin of the congestion. Therefore, similarly to the case that communication apparatus are connected at multi-stages in a communication network, it occurs sometimes that such essential congestion evasion that the transmitting origin is controlled at the time of generation of congestion depending on the generation state of congestion such as a case that a congestion is generated in buffers on the output side of an exchange.

SUMMARY OF THE INVENTION

It is an object of the present invention to provide a method of controlling a congestion in which a method of controlling a congestion in a communication network such as described above has been improved and an ATM communication apparatus having a structure suitable for congestion control. To be concrete, it is an object to provide a method of controlling a congestion in a communication network capable of notifying a communication apparatus of a congestion generated in the communication network at a high speed and moreover capable of sending this notification surely to a communication apparatus of a cell transmitting origin which causes the generation of a congestion, and is capable of performing traffic control of the transmitting origin at the time of generation of a congestion, and an ATM communication apparatus for realizing the method of controlling a congestion.

It is another object of the present invention to provide a method of controlling a congestion or an ATM communication apparatus which, when any communication apparatus detects a congestion generated in the communication apparatus in an ATM communication network, is capable of notifying the congestion to a communication terminal or a communication apparatus that is sending out a cell causing generation of a congestion and shortening the response time until the cell transmission speed is lowered, and moreover, is capable of utilizing a transmission band effectively. Namely, the object is to provide a method of controlling a congestion and an ATM communication apparatus for notifying a communication terminal or a communication apparatus that is transmitting a user cell causing a congestion of the congestion surely at a high speed so as to perform traffic control such as lowering the cell transmission speed in order to evade the congestion in the communication network, and utilizing a transmission band effectively while evading deterioration of the communication quality caused by the congestion in the network by controlling the cell transmission speed of the user cell transmitting origin.

Further, it is another object of the present invention to provide an ATM communication apparatus suitable for a communication network performing congestion control and having a structure capable of evading cell loss or the like caused by generation of a congestion even if the buffer quantity of cell buffers prepared in respective communication apparatus is small.

Furthermore, it is still another object of the present invention to provide an ATM communication apparatus having a structure of detecting, when a congestion is detected, a congestion generating origin at a high speed and notifying of the congestion generating origin.

In order to solve the above-mentioned subjects, according to the present invention, a communication apparatus is provided with a detecting portion for detecting a congestion of the buffer, a transmitting origin analyzing portion for analyzing a transmitting origin for inputting a cell in a buffer in which a congestion is generated, a notifying cell generating portion for notifying of a congestion and a transmitting portion for transmitting the notifying cell to the cell transmitting origin in accordance with the result of analysis. Further, when it is detected that a congestion state is produced in an optional communication apparatus in a communication network, this communication apparatus identifies a communication apparatus of a transmitting origin inputting a cell which causes the congestion, and notifies the apparatus of the cell transmitting origin directly of the generation of the congestion. In the apparatus of the cell transmitting origin which has received this notification, traffic control such as lowering of the cell sending speed is executed immediately so as to perform congestion control of the communication network, thereby to prevent overflow of buffers and cell loss in the communication apparatus in which the congestion has been detected.

To be more concrete, an ATM communication apparatus used in a communication network composed of an interface for inputting/outputting an ATM cell, a cell buffer for storing cells for exchange thereof, and a control portion for performing control such as setting of the interface and the cell buffer is provided with a congestion cell buffer detecting portion for detecting a congestion state for each cell buffer, a transmitting origin retrieving portion for retrieving a cell transmitting origin which has inputted the cell into the cell buffer based on the identifier of the cell buffer in which the congestion state has been detected, and an RM cell generating portion for drawing up an RM cell notifying of congestion generation and transmitting an RM cell to a retrieved cell transmitting origin.

Besides, the above-mentioned cell transmitting origin retrieving portion is constituted of a cell buffer identifier pair received cell header information retrieving portion for retrieving a path identifier (VPI) or a connection identifier (VCI) of a header of a received cell which is a path identifier added at the time of receiving a cell inputted to a cell buffer which has reached a congestion state from identifiers of cell buffers. Further, the above-mentioned RM cell generating portion gives retrieved VPI or VCI to the header of the RM cell and transmits this RM cell to the transmitting origin which has transmitted a cell which has caused the congestion, and is constituted of a congestion notifying RM cell generating portion for generating an RM cell added with congestion information based on retrieved received cell header information and an output portion for sending the RM cell to a communication terminal or a communication apparatus which is transmitting a cell which causes the congestion. Further, a congestion cell buffer identifier notifying portion for notifying the retrieving portion and the RM cell generating portion of the output of the congestion cell buffer detecting portion using a signal of a format predetermined within an apparatus such as a maintenance cell may be provided inside the apparatus so that retrieval of a cell transmitting origin and RM cell transmission may be performed even for a communication apparatus having a structure in which a cell buffer, an interface and a control portion are separated from one another.

DESCRIPTION OF THE PREFERRED EMBODIMENTS

An ATM communication apparatus according to the present invention and a method of controlling a congestion in a communication network using this apparatus will be described in detail hereinafter with reference to the drawings.

Figure 1:
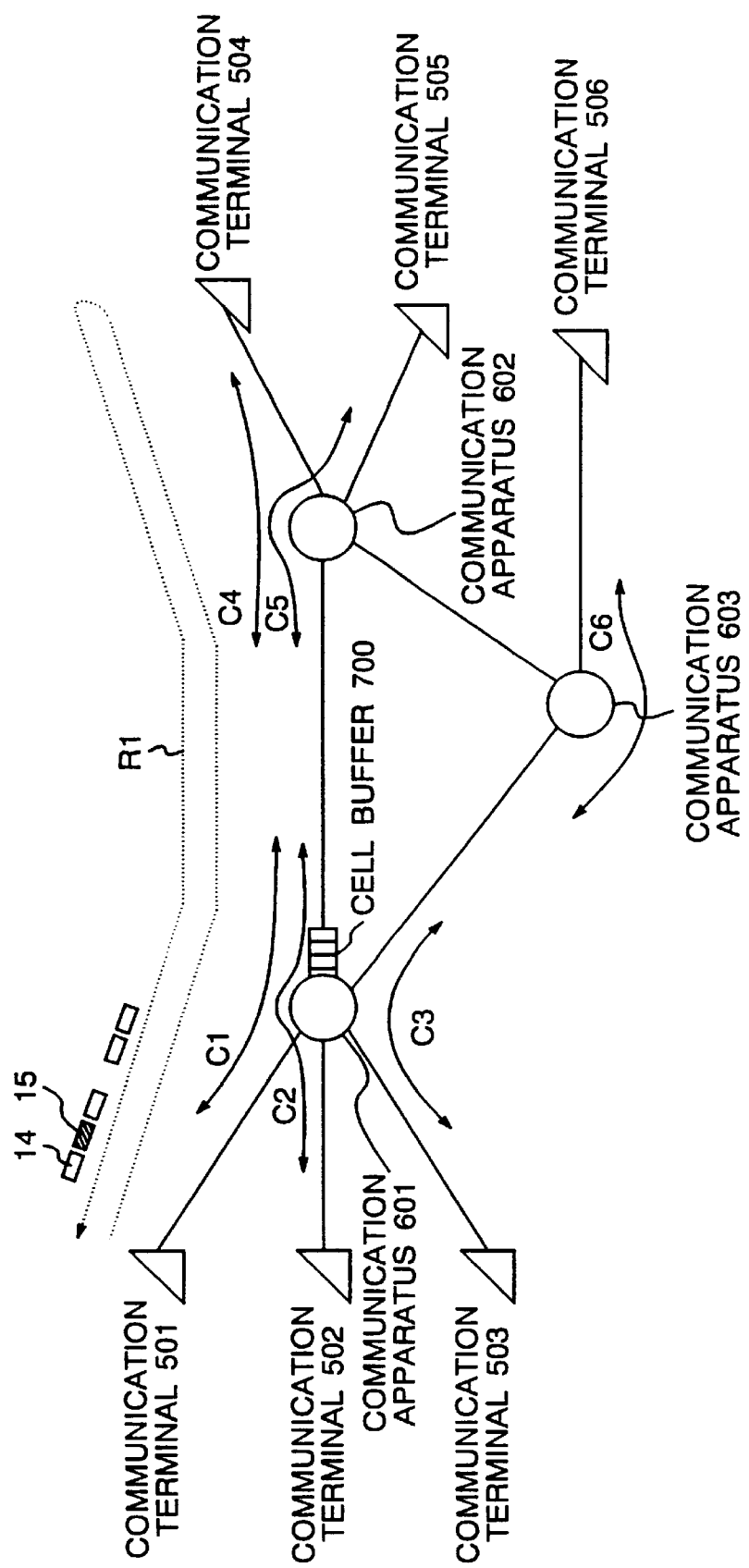
FIG. 1 is a network block diagram showing a schematic structure and congestion control operation of an ATM communication network.
Figure 2:
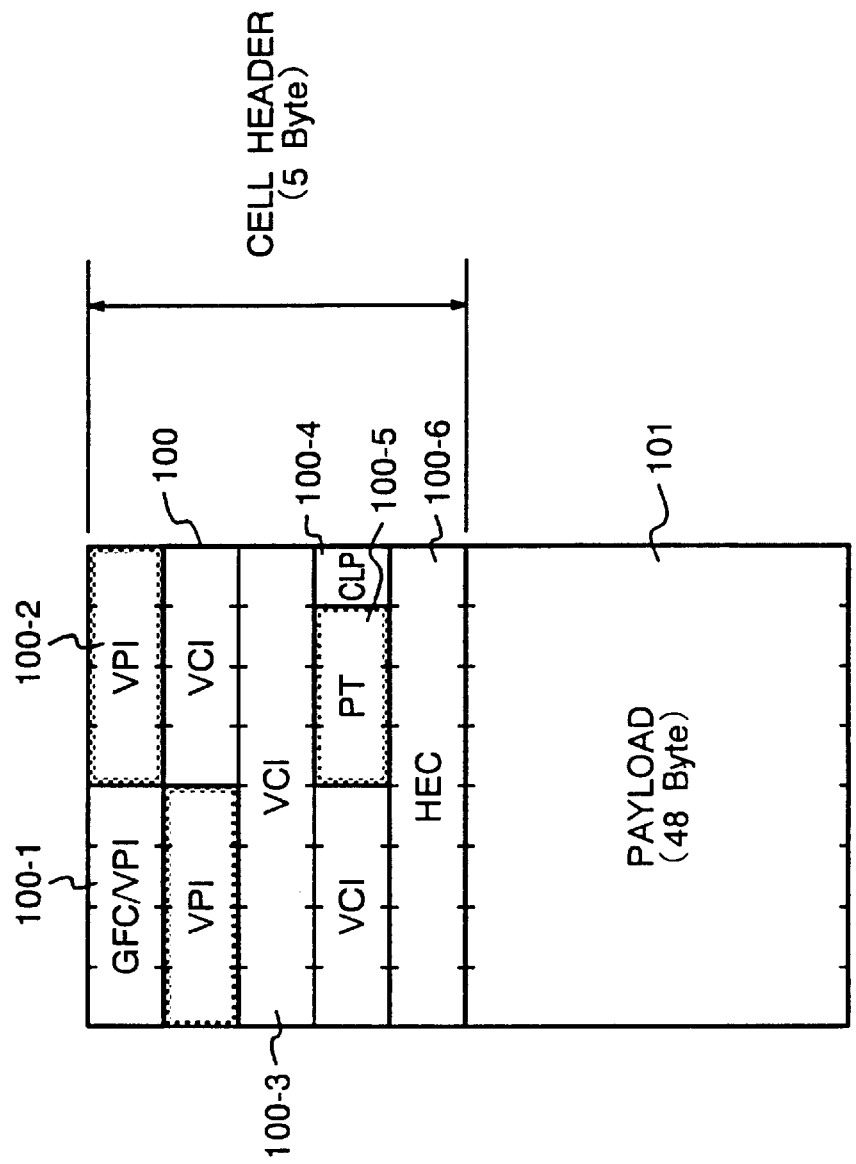
FIG. 2 is a cell block diagram showing a structure of an ATM cell.

FIG. 1 is a network block diagram showing a schematic structure and congestion control operation of an ATM communication network, and FIG. 2 is a cell block diagram showing a structure of an ATM cell such as a user cell and an RM cell transmitted and received in an ATM communication network. First, congestion control operation using an RM cell in the ATM communication network will be described.

As shown in FIG. 1, the ATM communication network is composed of six sets of communication terminals 501 to 506 and three sets of ATM communication apparatus 601 to 603, and connects among these apparatus by such cell connection (hereinafter referred to as connection) as C1 to C4 so as to perform cell transmission/reception and exchange among communication terminals, and shows an example that the communication terminals 501 and 504 communicate with each other through the communication apparatus 601 and 602 by means of connections C1 and C4, the communication terminals 502 and 505 communicate with each other through the communication apparatus 601 and 602 by means of connections C2 and C5, and the communication terminals 503 and 506 communicate with each other through the communication apparatus 601 and 603 by means of connections C3 and C6.

In a communication network performing congestion control using an RM cell, respective communication terminals generate an RM cell 15 for adjusting a transmitting speed of own user cell 14 and send it while inserting it periodically in an interval of the user cell 14 toward opposing communication terminals such as the communication terminals 501 to 504 (a route R1). When no congestion has been generated in a buffer such as a cell buffer 700 during a process of transferring the user cell 14 toward opposing communication terminals from the communication terminals 501 to 503 to the communication terminals 504 to 506, the RM cell 15 which has been sent by respective transmitting side communication terminals 501 to 503 is sent back as it is by return at respective receiving side communication terminals 504 to 506 that are opposing communication terminals. Then, at the transmitting side communication terminals 501 to 503, the RM cell 15 sent back by return is received again, respectively, and the transmission speed of own user cell is increased when it is confirmed that congestion information is not included.

Here, when a congestion is being generated in the cell buffer 700 at the transmitting end of a communication apparatus 601 to a communication apparatus 602, the communication apparatus 601 affixes a mark indicating that the congestion cell buffer 700 has been passed to the headers of all of the user cells 14 transferred in accordance with connections C1 and C2 which pass through the congestion cell buffer 700 while the congestion state is continued when the user cell 14 is made to pass through the congestion cell buffer 700 during a process of transferring the user cell 14 to the opposing communication terminal. Besides, this mark is affixed to a PT field 100-4 located in a header 100 of a cell described later. In the communication terminals 504 and 505, when it is confirmed that a mark has been affixed in the header of the user cell 14 received immediately before the received RM cell 15, congestion information is added to the header of the received RM cell, and the received RM cell is returned to the communication terminals 501 and 502 that are transmitting origins, respectively. In the communication terminals 501 and 502, the RM cell 15 attached with congestion information is received, and the transmission speed of its own user cell is lowered. By controlling the cell transmission speed of the transmitting origin communication terminal of the user cell 14 through a process described above, the transmission band is utilized effectively while evading the congestion in the network.

The method of controlling a congestion according to the present invention is formed so as to notify a communication terminal or a communication apparatus of a congestion faster than conventional processing and also surely, thus executing congestion control in a communication network by newly generating an RM cell, and transmitting the RM cell to a communication terminal or a communication apparatus which is transmitting a user cell which causes the congestion, when a congestion is generated in a communication apparatus in a network in addition to the above-mentioned RM cell which is generated by a cell transmitting origin communication apparatus controlling the transmission speed and sent back by turn by a receiving side communication apparatus.

Figure 3:
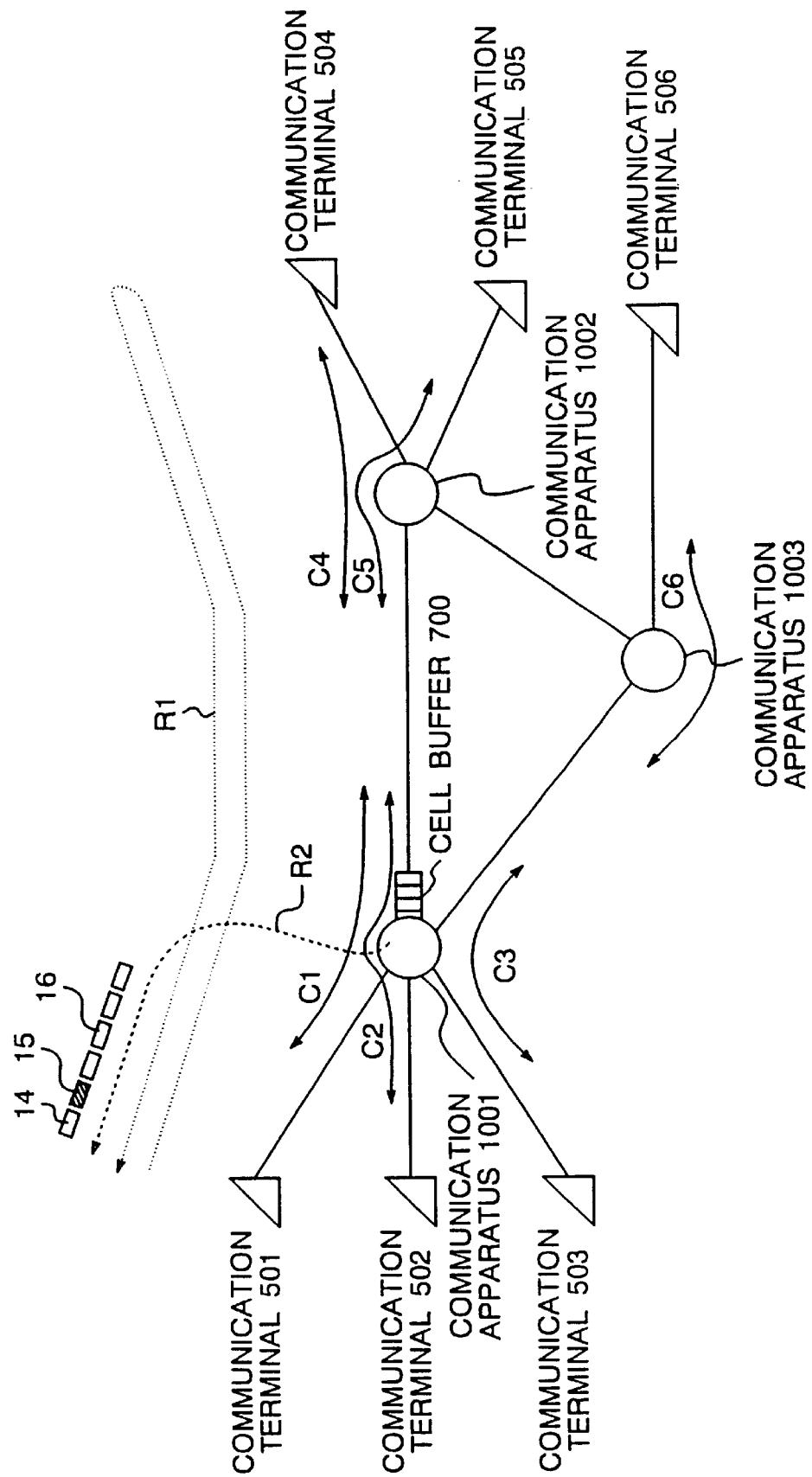
FIG. 3 is a network block diagram showing a schematic structure and congestion control operation of an ATM communication network according to the present invention.

FIG. 3 is a network block diagram showing a schematic structure and congestion control operation of an ATM communication network according to the present invention, and a method of controlling ATM congestion according to the present invention will be described hereinafter with reference to FIG. 3.

An ATM communication network is composed of six sets of communication terminals 501 to 506 and three sets of ATM communication apparatus 1001 to 1003 (detailed structure and operation thereof will be described later) according to the present invention, and performs transmission/reception and exchange of cells among communication terminals by connecting these apparatus through connections of cells such as C1 to C4 (hereinafter referred to as connection), and shows an example in which the communication terminals 501 and 504 communicate with each other through the communication apparatus 1001 and 1002 by means of connections C1 and C4, the communication terminals 502 and 505 communicate with each other through the communication apparatus 1001 and 1002 by means of connections C2 and C5, and the communication terminals 503 and 506 communicate with each other through the communication apparatus 1001 and 1003 by means of the connections C3 and C6, and is a communication network having a similar structure to the network structure shown in FIG. 1. Further, respective transmitting side communication terminals 501 to 503 generate the RM cell 15 for adjusting the transmission speed of the user cell 14 and send the RM cell 15 by inserting it periodically at an interval of the user cell, and the operation that respective receiving side communication terminals 504 to 506 send back the RM cell 15 by return and the processing process of the RM cell 15 when a congestion is detected are the same as the congestion control operation of the communication network shown in FIG. 1.

In an ATM communication apparatus according to the present invention and a communication network using the same, when a congestion is generated in a cell buffer 700 located at a transmitting end from the communication apparatus 1001 to the communication apparatus 1002 for instance, in the communication apparatus 1001, when this congestion is detected and while the congestion state is continued similarly to the communication apparatus shown in FIG. 1, a mark indicating that a congestion has been generated is affixed to headers of all of the cells 14 transferred in accordance with the connections C1 and C2 that pass through the cell buffer 700 where a congestion has been generated exactly as conventional processing, and VPI 100-2 and VCI 100-3 at the time of cell reception given to the header 100 of the user cell 14 inputted to the cell buffer 700 are retrieved, so that the communication terminals 501 and 502 of the transmitting origin are identified. Further, an RM cell 16 for notifying of a congestion is produced newly in the communication apparatus 1001 separately from the RM cell 15 described previously, and VPI 100-2 and VCI 100-3 corresponding to each of these transmitting origin communication terminals 501 and 502 are given to the header 100 and the RM cell 16 is transmitted toward respective communication terminals 501 and 502 (a route R1). Besides, in case there is no congestion cell buffer 700 in the transmission process of the cell as communication from the communication terminal 503 to 506, 506 to 503, 504 to 501 and 505 to 502, the processing is similar to conventional processing described previously.

With the processing described above, generation of a congestion is notified surely to the communication apparatus of the transmitting origin, and moreover, congestion control faster in response than a conventional control method is realized. Accordingly, a communication apparatus in which cell discard is not generated even in a state that the quantity of buffers provided in respective communication apparatus is reduced, can be realized and applied, and thus a communication network for executing economical, high-speed and high performance congestion control is provided.

A structural example of an ATM communication apparatus provided with a congestion control function according to the present invention will be described in detail hereunder.

Figure 4:
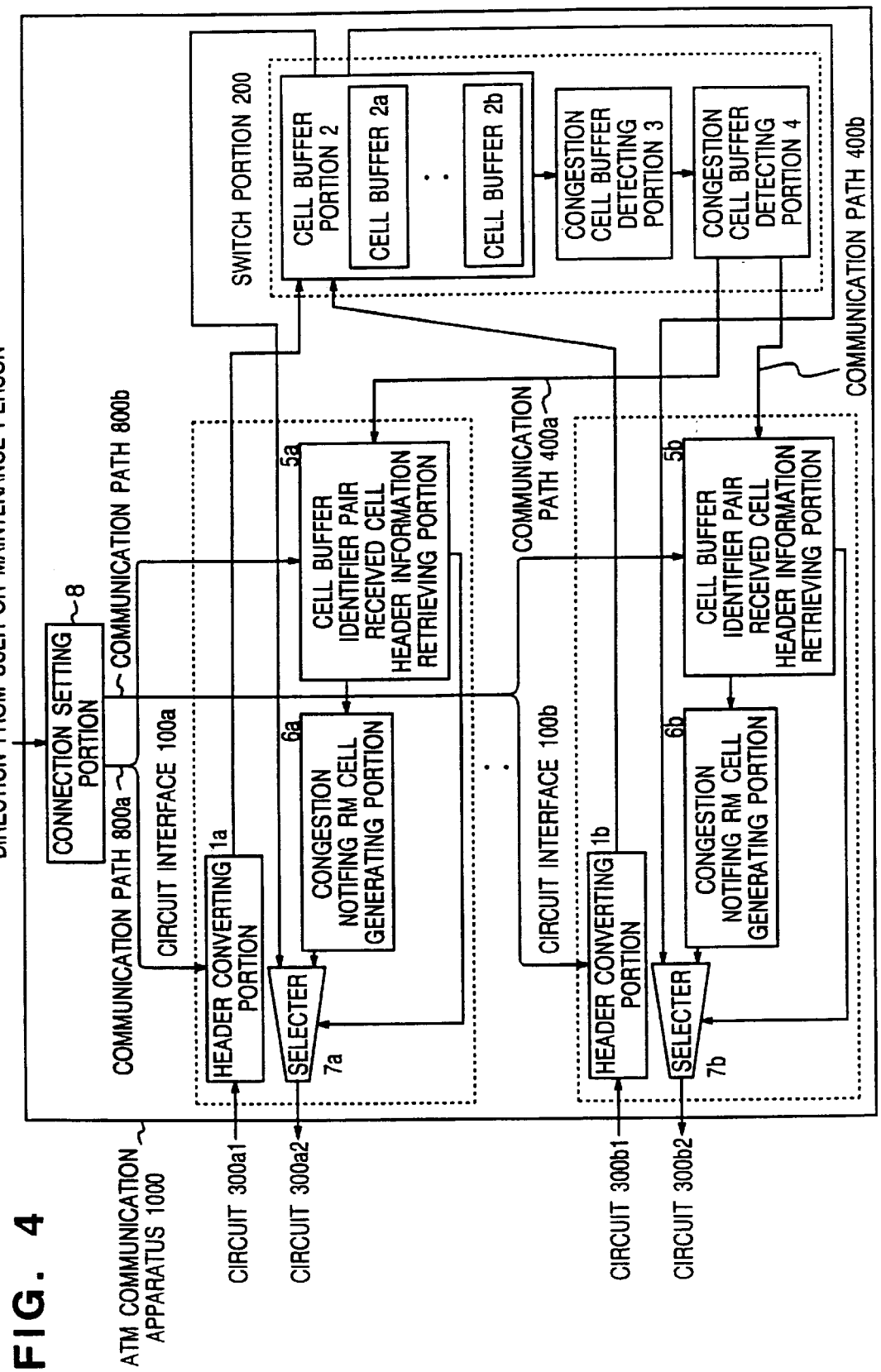
FIG. 4 is a block diagram showing a structure of an ATM communication apparatus according to the present invention.
Figure 5:
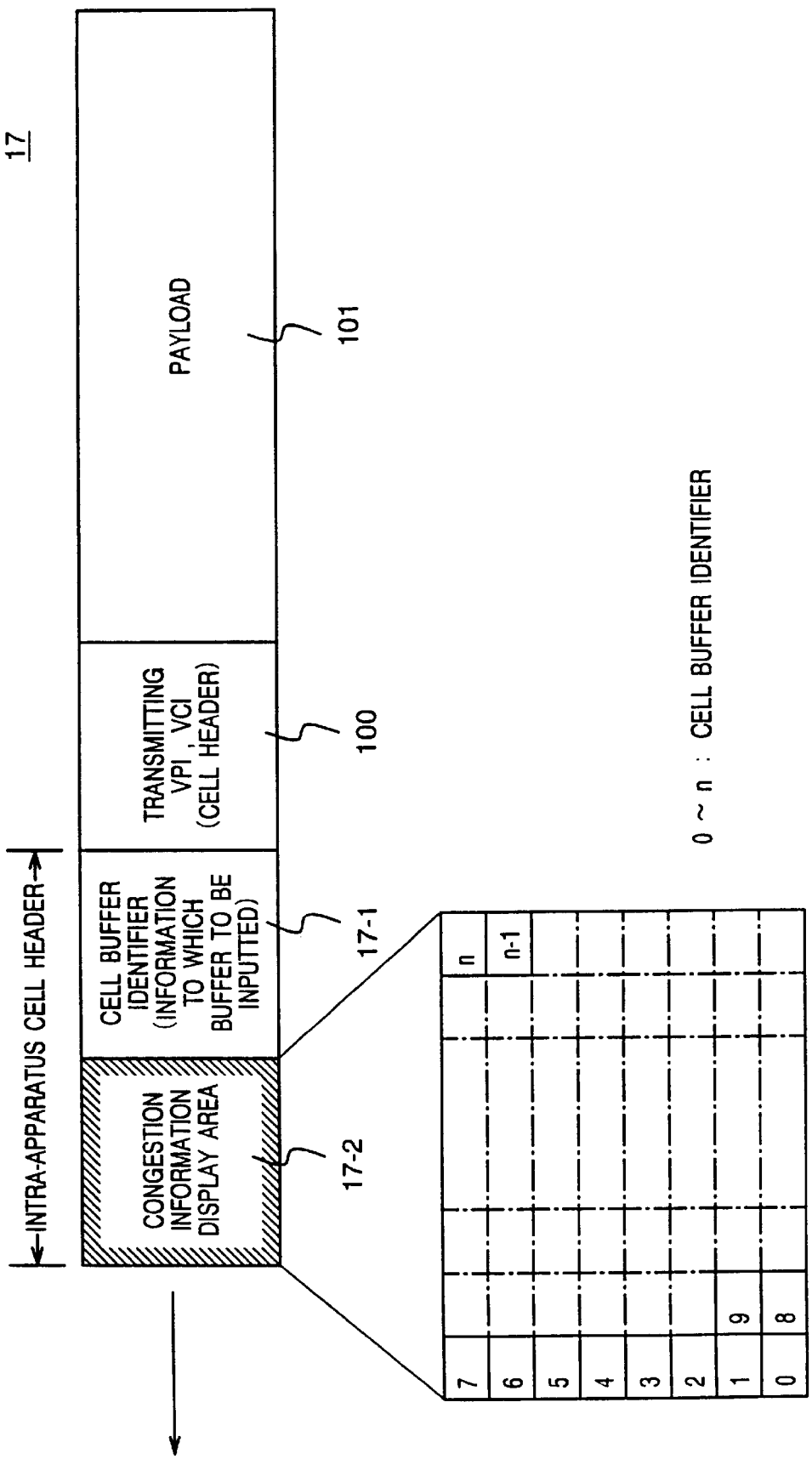
FIG. 5 is a cell block diagram showing a structure of a cell used inside an ATM communication apparatus.

FIG. 4 is a block diagram of an ATM communication apparatus provided with a congestion control function according to the present invention. Further, FIG. 5 is a cell block diagram showing a structure of an internal cell 17 used in the ATM communication apparatus.

An ATM communication apparatus 1000 is composed of a plurality of circuit interfaces 100 (100a to 100b in the present embodiment) for inputting/outputting ATM cells through circuits 300, a switch portion 200 for exchanging the ATM cells, and a connection setting portion 8 which is a control portion for controlling the circuit interfaces 100 and the switch portion 200, and the circuit interfaces 100 are provided with header converting portions 1 (1a and 1b), cell buffer identifier pair received cell header information retrieving portions 5 (5a and 5b) that are cell transmitting origin retrieving portions for retrieving a transmitting origin communication apparatus of a cell which causes a congestion from a congestion state detected in the apparatus, congestion notifying RM cell generating portions 6 (6a and 6b) for generating a congestion notifying RM cell 16 to be sent to a cell transmitting origin, and selector portions 7 (7a and 7b) which insert the congestion notifying RM cell 16 in circuits 300 and transmit it to the cell transmitting origin. Further, the switch portion 200 is provided with cell destination circuit corresponding cell buffer portion 2 (2a and 2b) for storing and exchanging inputted user cells 14, a cell buffer detecting portion 3 for detecting congested cell buffer, and a congestion cell buffer identifier notifying portion 4 for notifying the circuit interface of the result of detection with speech paths 400 (400a and 400b).

The operation of the ATM communication apparatus 1000 will be described hereinafter.

The header converting portions 1a and 1b convert VPI 100-2 and VCI 100-3 added to the header of the received cell inputted from circuits 300a1 and 300b1 into VPI 100-2 and VCI 100-3 of the destination to which the cell is transmitted after exchange in the switch portion 200, and in addition, add routing information (cell buffer identifier) 17-1 showing to which cell buffer 2 (2a or 2b) the inputted respective cells are to be inputted to the header 100 of the intra-apparatus cell 17 for cell exchange in the switch portion. Besides, in the ATM communication apparatus 1000 shown in the present embodiment, a congestion information display area 17-2 added to the intra-apparatus cell shown in FIG. 5 is not used. Therefore, an intra-apparatus cell 17 which is not added is used here. (An embodiment using this congestion information display area 17-2 will be described later separately.)

The cell buffer portion 2 is exchanged for respective circuit interfaces 100a and 100b by storing the intra-apparatus cell 17 distributing among cell buffers 2a and 2b in accordance with the routing information 17-1.

When the quantity of intra-apparatus cells 17 stored in respective cell buffers 2a and 2b exceeds a preset threshold, the congestion cell buffer detecting portion 3 decides that a congestion is generated in those cell buffers and detects an identifier of a cell buffer in which a congestion is generated (a congestion cell buffer identifier). Besides, in the present embodiment, the routing information 17-1 added to the stored cells has been utilized as it is.

The congestion cell buffer identifier notifying portion 4 conveys the cell buffer identifier (the routing information 17-1) of the congestion cell buffer detected in the congestion cell buffer detecting portion 3 to the circuit interfaces 100a and 100b through communication paths 400a and 400b.

The cell buffer identifier pair received cell header information retrieving portions 5a and 5b for retrieving the cell transmitting origin from the detected congestion state retrieve received VPI and VCI (VPI and VCI before header conversion in the header converting portions 1a and 1b) which have been added to the header 100 at the time of receiving the user cell 14 inputted to the congestion cell buffer using the congestion cell buffer identifier (17-1) received from the congestion cell buffer identifier notifying portion 4 through the communication paths 400a and 400b. Besides, the structure and operation of the present cell buffer identifier pair received cell header information retrieving portion 5 will be described in detail later with reference to the drawings.

The congestion notifying RM cell generating portions 6a and 6b generate a congestion notifying RM cell 16 having VPI and VCI similar to received VPI and VCI corresponding to the cell transmitting origins retrieved in the cell buffer identifier pair received cell header information retrieving portions 5a and 5b in the header. Besides, the congestion notifying RM cell 16 is an RM cell newly produced in the present apparatus in order to notify the transmitting origin of the cell which has been inputted in the congestion cell buffer of the congestion.

The selector portions 7a and 7b output the intra-apparatus cell 17 outputted from the cell buffer portion 2 with the header (routing information 17-1) eliminated to interfaces 300a1 and 300b2 as the transmitting cell (the user cell 14 and the RM cell 15 turned back from the receiving side apparatus) when the congestion notifying RM cell 16 is not generated, and output the congestion notifying RM cell 16 while inserting it in a transmitting cell to the interfaces 300a2 and 300b2 when the congestion notifying RM cell 16 is generated by the control from the cell buffer identifier pair received cell header information retrieving portions 5a and 5b.

The connection setting portion 8 sets a table (not shown) for storing information for header conversion in header converting portions 1a and 1b through communication paths 800a and 800b in accordance with a direction from a user or a maintenance person, and also sets a table for storing information for retrieving received VPI and VCI from the cell buffer identifier 17-1 provided in cell buffer identifier pair received cell header information retrieving portions 5a and 5b which will be described later.

Figure 6:
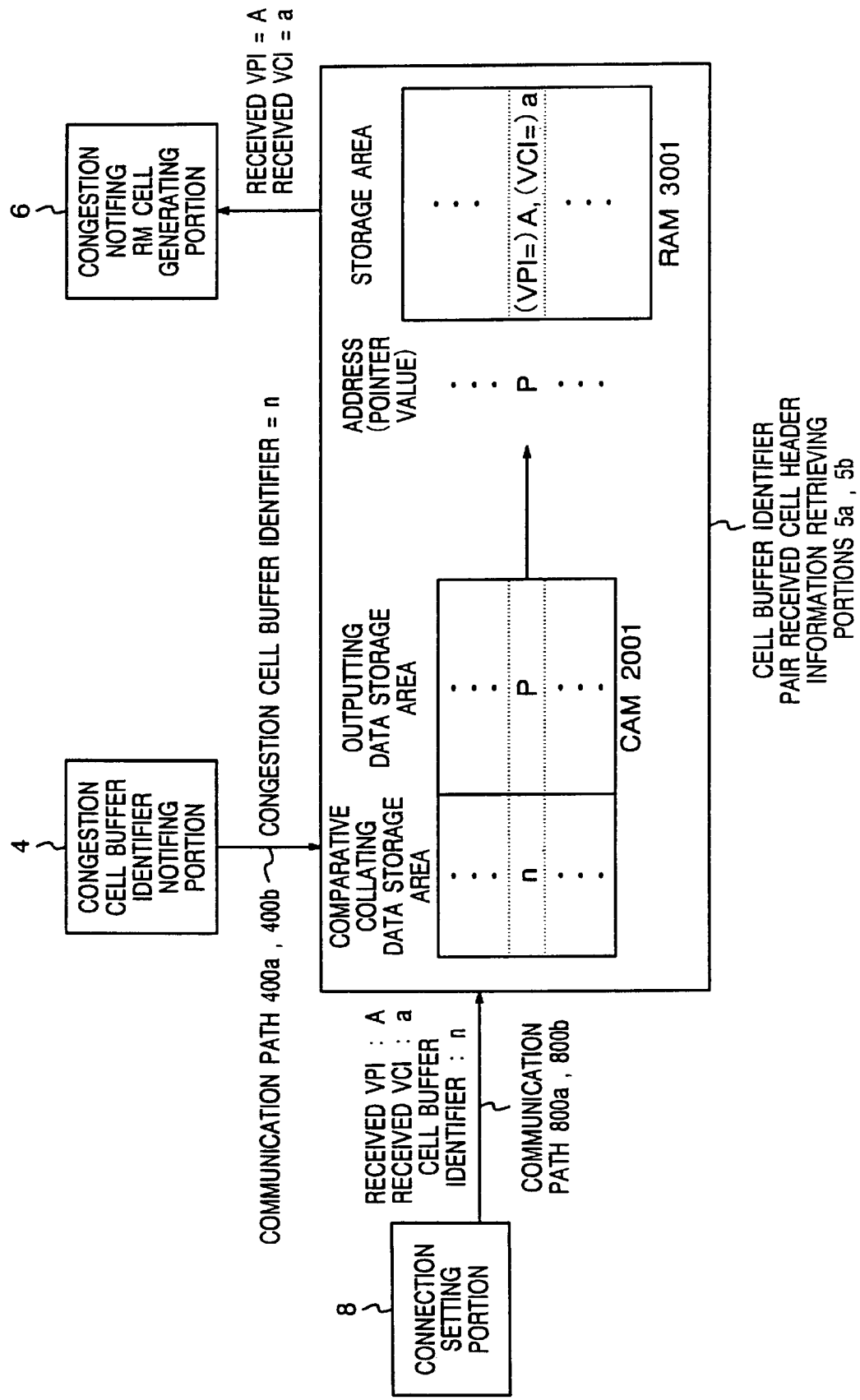
FIG. 6 is a block diagram showing a structure of a cell transmitting origin retrieving portion according to the present invention.

FIG. 6 is a block diagram showing a structure of the cell buffer identifier pair received cell header information retrieving portion 5 (5a and 5b) which becomes a transmitting origin retrieving portion according to the present invention.

The cell buffer identifier pair received cell header information retrieving portion 5 has been composed of two tables using a contented addressable memory (CAM) 2001 and a random access memory (RAM) 3001. By retrieving VPI and VCI of the received header owned by a cell inputted to a cell buffer where a congestion has been generated before the header is converted in the header converting portions 1a and 1b with the congestion cell buffer identifier (17-1) as the key with these tables, it has been structured so that the cell transmitting origin may be retrieved. Namely, a cell buffer identifier (routing information 17-1 in the present embodiment) and VPI and VCI of a received cell are stored and set in the table so as to perform retrieval, and the setting of this table is structured so that it is performed in a similar manner when the routing information 17-1 designating the cell buffer to which the received cell is to be inputted for a corresponding relationship of VPI and VCI of the received cell with VPI and VCI of the transmitted cell after header conversion or cell exchange is set in a separate table (not shown) provided in header converting portions 1a and 1b through communication paths 800a and 800b in order that the connection setting portion 8 performs establishment of connection and header conversion in accordance with a direction from a user or a maintenance personnel.

As shown in FIG. 6, the table is formed by combining the CAM 2001 and the RAM 3001 with each other, and a cell buffer identifier (routing information 17-1) and VPI 100-2 and VCI 100-3 that have been given at the time of receiving a cell inputted to the cell buffer are given as the data for a table from the connection setting portion 8. The cell buffer identifier is stored as comparative collating data in the comparative collating data storage area of the CAM 2001, and a pointer number granted to each cell buffer identifier is stored in the output data storage area. Further, in the storage area of the RAM 3001 with the pointer number as an address, VPI and VCI that have been granted at the time of receiving a cell inputted to the cell buffer shown with the cell buffer identifier.

When the cell buffer identifier pair received cell header information retrieving portions 5a and 5b in which a table has been set as described above receive a congestion cell buffer identifier from the congestion cell buffer identifier notifying portion 4, comparative collating data equal to the congestion cell buffer identifier are retrieved from the comparative collating data storage area of the CAM 2001, a pointer value of output data that has been collated is read, and the value which has been stored in the storage area of the RAM 3001 with this pointer value as the address, i.e., VPI and VCI that have been granted at the time of receiving a cell inputted in the cell buffer where a congestion shown with the congestion cell buffer identifier has been generated are notified to a congestion notifying RM cell generating portion 6 as a result of identifying the communication apparatus of the cell transmitting origin.

In the case of the exemplification shown in FIG. 6, when a user or a maintenance person directs the connection setting portion 8 to establish such connection that a received cell having VPI of A and VCI of a is applied with header conversion and outputted after exchanged being distributed among cell buffers having the cell buffer identifier of n, such information that received VPI=A, VCI=a and cell buffer identifier=n is given to the cell buffer identifier pair received cell header information retrieving portions 5a and 5b from the connection setting portion 8 through communication paths 800a and 800b. Thus, n as comparative collating data of the CAM 2001, received VPI=A, VCI=a in the storage area of the RAM 3001, and an address P of the storage area of the RAM 3001 as outputting data of the CAM 2001 are stored. Here, when a congestion is generated in a cell buffer having a cell buffer identifier of n, notification that the congestion cell buffer identifier=n is made from the congestion cell buffer identifier notifying portion 4, a value n is found in the comparative collating data storage area and outputting data P are read in the cell buffer identifier pair received cell header information retrieving portions 5a and 5b, and the data of A and a stored in the storage area of the RAM 3001 of the address P are notified to the congestion notifying RM cell generating portion 6 as VPI and VCI that have been granted at the time of receiving a cell inputted to a cell buffer where the congestion has been generated. With the above, retrieval of VPI and VCI of a received cell inputted to a congestion cell buffer in the cell buffer identifier pair received cell header information retrieving portions 5a and 5b is completed.

Next, a congestion notifying RM cell having VPI and VCI as the header is generated in the congestion notifying RM cell generating portion 6. When the congestion notifying RM cell is generated, as shown in FIG. 4, the cell buffer identifier pair received cell header information retrieving portions 5a and 5b control the selectors 7a and 7b, switch the outputs thereof to the congestion notifying RM cell generating portion 6 side, suspend sending of the cell from the cell buffer portion 2, and transmit the congestion notifying RM cell to the transmitting origin communication apparatus of a cell which has caused generation of a congestion through the circuits 300a2 and 300b2. Besides, since there is no operation of generation and transmission of the above-mentioned congestion notifying RM cell in a state that there is no congestion cell buffer, the selectors 7a and 7b select the cell buffer portion 2 side by the control of the cell buffer identifier pair received cell header information retrieving portions 5a and 5b, and output the cell outputted from the cell buffer portion 2 as a transmitting cell to the interfaces 300a2 and 300b2.

As described above, by using an ATM communication apparatus according to the present invention in a communication network, it becomes possible to notify of a congestion to a communication terminal or a communication apparatus transmitting a cell which causes the congestion faster and more surely than congestion control processing of a conventional communication network, and also to reduce the quantity of buffers provided in the communication apparatus.

Figure 7:
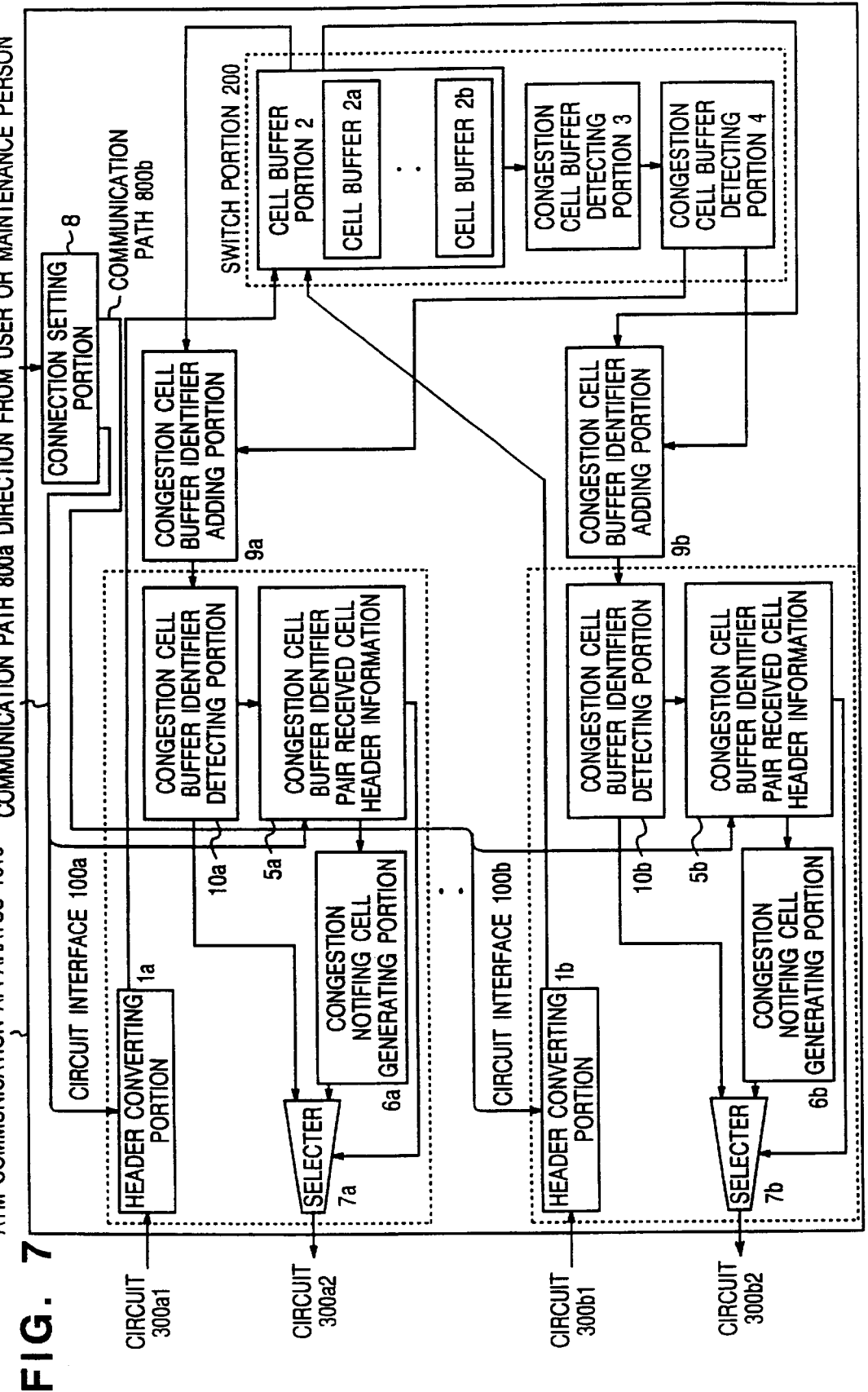
FIG. 7 is a block diagram showing another structure of an ATM communication apparatus according to the present invention.

FIG. 7 is a block diagram showing another structure of an ATM communication apparatus provided with a congestion control function according to the present invention. This communication apparatus 1010 has a structure that, in the structure of the above-mentioned communication apparatus 1000, a congestion information display area 17-2 is also added as an intra-apparatus cell shown in FIG. 5, and the transmitting origin of a cell which has generated a congestion is identified using the display area 17-2 and an RM cell is sent to a transmitting origin communication apparatus, in which congestion cell buffer identifier adding portions 9a and 9b adding the congestion information display area 17-2 to the cell 17 in the device and congestion cell buffer identifier extracting portions 10a and 10b for taking out the identifier of the congestion cell buffer from the congestion information display area 17-2 are added.

The ATM communication apparatus 1010 processes when header conversion is performed in the header converting portions 1a and 1b, an intra-apparatus cell in which a congestion information display area 17-2 for all of the cell buffer portions provided in the apparatus is provided in addition to the header 100 and the routing information 17-1 of the intra-apparatus cell 17. When a certain cell buffer shows a congestion state exceeding a threshold in a preset number of storage cell in the buffer, the congestion cell buffer is detected in the congestion cell buffer detecting portion 3, and the identifier of the cell buffer is notified to all of congestion cell buffer identifier adding portions 9a and 9b from the congestion cell buffer identifier notifying portion 4. In the congestion cell buffer identifier adding portions 9a and 9b, the congestion cell buffer identifier is stored in the congestion information display area 17-2 of all the intra-apparatus cells 17 outputted from the cell buffer portion 2. To be concrete, as shown in FIG. 5, since it is structured so that the congestion information display area 17-2 is provided in a bit map form in the header of the intra-apparatus cell while having an area of one bit per one cell buffer correspond to the cell buffer identifier for all of the cell buffer portions, in the congestion cell buffer identifier adding portions 9a and 9b, 0 is written at a bit position corresponding to a non-congestion cell buffer and 1 is written at a bit position corresponding to the congestion cell buffer. For example, when explanation is made with respect to a case similar to that described in the previous embodiment, since congestion is generated in the cell buffer n, 1 which means congestion generation is written at the bit position of n generated in the cell buffer n, and, since no congestion has been generated in another cell buffer, 0 which means congestion ungeneration is written at another bit position corresponding to that buffer.

In the congestion cell buffer identifier extracting portions 10a and 10b, the congestion cell buffer identifier is extracted from the congestion information display area 17-2 of the inputted cell 17 in the apparatus and inputted to the cell buffer identifier pair received cell header information retrieving portions 5a and 5b. To be concrete, in the congestion cell buffer identifier extracting portions 10a and 10b, the contents of the congestion information display area 17-2 of the cell 17 in the apparatus are read, it is decided whether respective cell buffers are in a non-congestion state or in a congestion state, and the identifier of the cell buffer corresponding to the bit position where one has been written is outputted as a congestion cell buffer identifier. In the cell buffer identifier pair received cell header information retrieving portions 5a and 5b, VPI and VCI that have been granted at the time of receiving the cell inputted to the congestion cell buffer are retrieved from the cell buffer identifier similarly to the previous embodiment. The operation after the congestion cell buffer identifier is inputted to the cell buffer identifier pair received cell header information retrieving portions 5a and 5b and the received VPI and VCI are retrieved is also similar to that in the previous embodiment.

Figure 8:
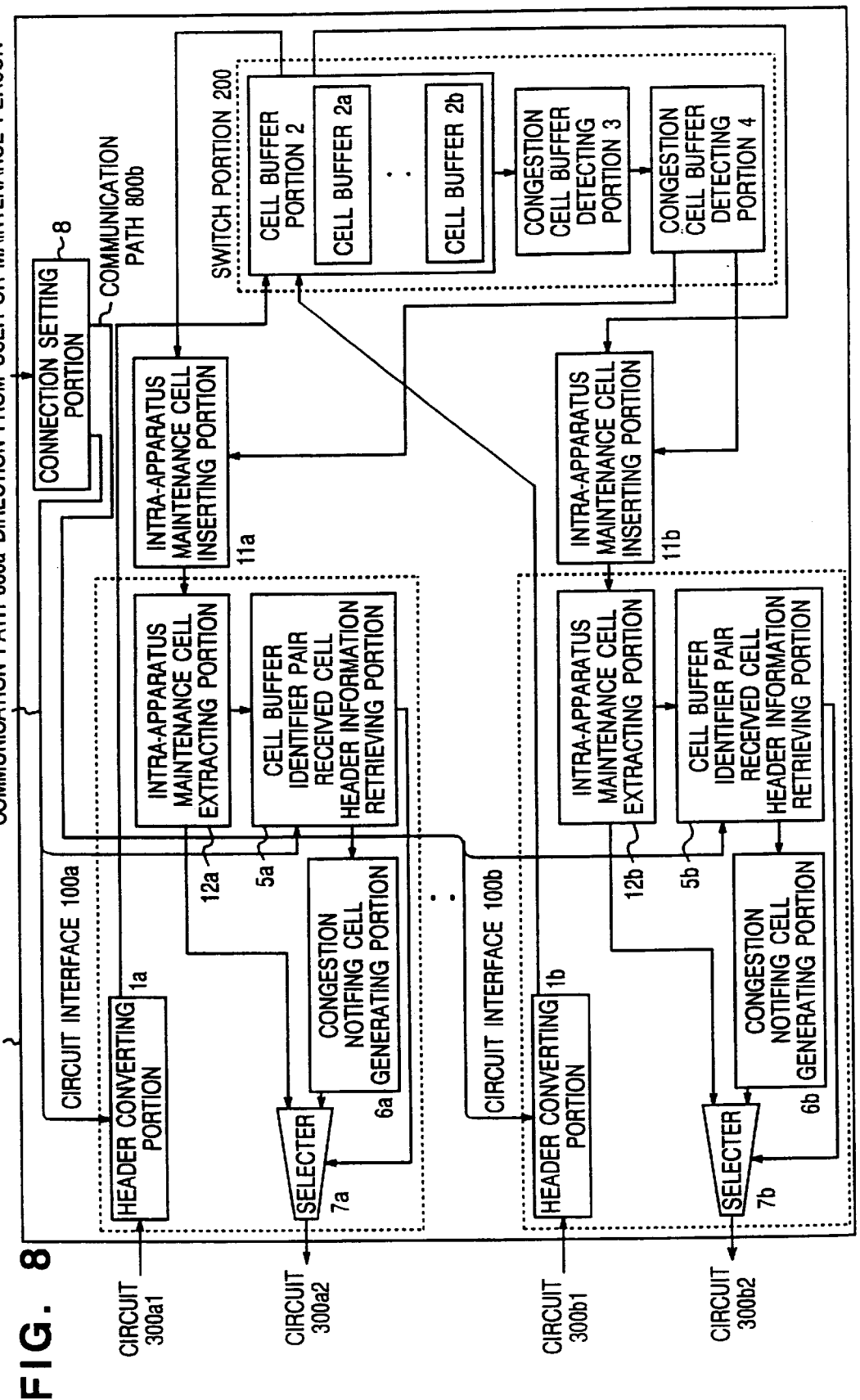
FIG. 8 is a block diagram showing still another structure of an ATM communication apparatus according to the present invention.
Figure 9:
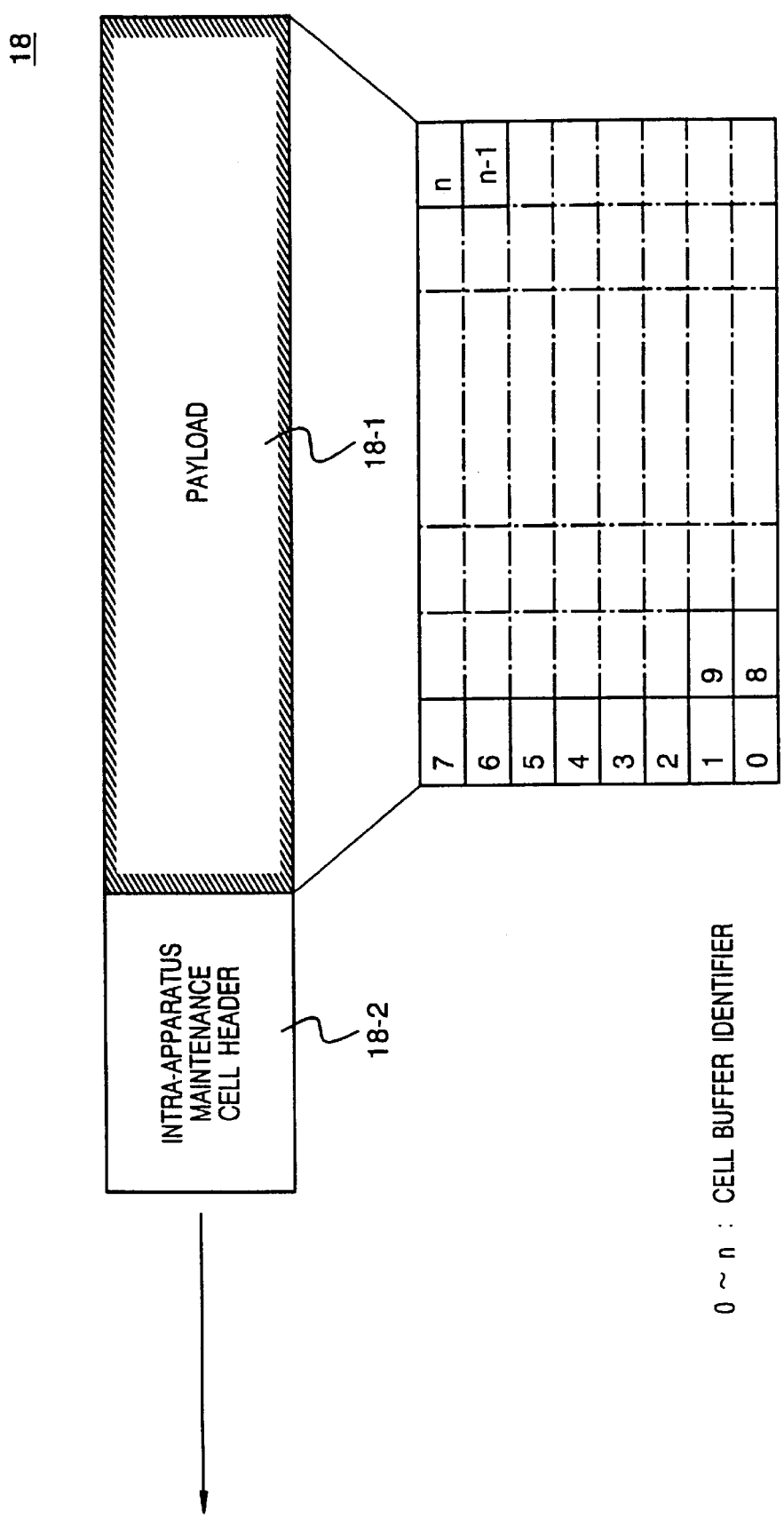
FIG. 9 is a cell block diagram showing a structure of a maintenance cell used inside an ATM communication apparatus according to the present invention.

FIG. 8 is a block diagram showing another structure of an ATM communication apparatus provided with a congestion control function according to the present invention. In contrast to that the structure of the above-mentioned communication apparatus 1010 utilizes the intra-apparatus cell 17 added with the congestion information display area 17-2 as the means for notifying of the congestion cell buffer identifier to the cell buffer identifier pair received cell header information retrieving portions 5a and 5b, the communication apparatus 1020 specifies an intra-apparatus maintenance cell 18 for newly storing control information in the apparatus and notifies of the identifier of the cell buffer where a congestion has been generated to the cell buffer identifier pair received cell header information retrieving portions 5a and 5b utilizing the payload of the cell. Further, FIG. 9 is a cell block diagram showing a structure of an intra-apparatus maintenance cell 18. This maintenance cell 18 has been composed of a payload portion 18-1 for storing maintenance information and a header 18-2 showing that it is a maintenance cell.

The ATM communication apparatus 1020 has a structure that a transmitting origin of a cell where a congestion has been generated is identified and an RM cell is sent to the transmitting origin communication apparatus by notifying of the congestion cell buffer identifier to the cell buffer identifier pair received cell header information retrieving portions 5a and 5b using the intra-apparatus maintenance cell 18, and is provided with intra-apparatus maintenance cell inserting portions 11a and 11b for storing the congestion cell buffer identifier in the payload portion 18-1 of the intra-apparatus maintenance cell 18 when a congestion in the cell buffer is generated in place of the congestion cell buffer identifier adding portions 9a and 9b in the ATM communication apparatus 1010, and intra-apparatus maintenance cell extracting portions 12a and 12b for reading the congestion cell buffer identifier from the payload portion 18-1 of the maintenance cell 18 and inputting it to the cell buffer identifier pair received cell header information retrieving portions 5a and 5b are added in place of the congestion cell buffer identifier extracting portions 10a and 10b.

In the present embodiment, since the structure of the data for notifying of the congestion cell buffer identifier in the payload 18-1 of the intra-apparatus maintenance cell 18 is formed to be the same structure as the congestion information display area 17-2 described in the previous embodiment, 0 is written at the bit position corresponding to the non-congestion cell buffer in the payload 18-1 and 1 is written at the bit position corresponding to the congestion cell buffer in the intra-apparatus maintenance cell inserting portions 11a and 11b. Further, in the intra-apparatus maintenance cell extracting portions 12a and 12b, the congestion cell buffer identifier is extracted from the payload 18-1 of the inputted maintenance cell 18 and is inputted to the cell buffer identifier pair received cell header information retrieving portions 5a and 5b. To be concrete, the contents of the payload 18-1 are read, it is decided whether respective cell buffers are in a non-congestion state or in a congestion state, and the identifier of the cell buffer corresponding to the bit position where 1 has been written is outputted as a congestion cell buffer identifier. In the cell buffer identifier pair received cell header information retrieving portions 5a and 5b, VPI and VCI that have been given at the time of receiving the cell inputted to the congestion cell buffer from the cell buffer identifier are retrieved similarly to the previous embodiment. The operation after the congestion cell buffer identifier is inputted to the cell buffer identifier pair received cell header information retrieving portions 5a and 5b and received VPI and VCI are retrieved is similar to that of the previous embodiment.

Another structure of the cell buffer identifier pair received cell header information retrieving portions 5a and 5b that are retrieving portions of the cell transmitting origin communication apparatus used in the ATM communication apparatus according to the present invention will be described hereinafter. Either structure is applicable to the above-mentioned ATM communication apparatus 1000, 1010 and 1020.

Figure 10:
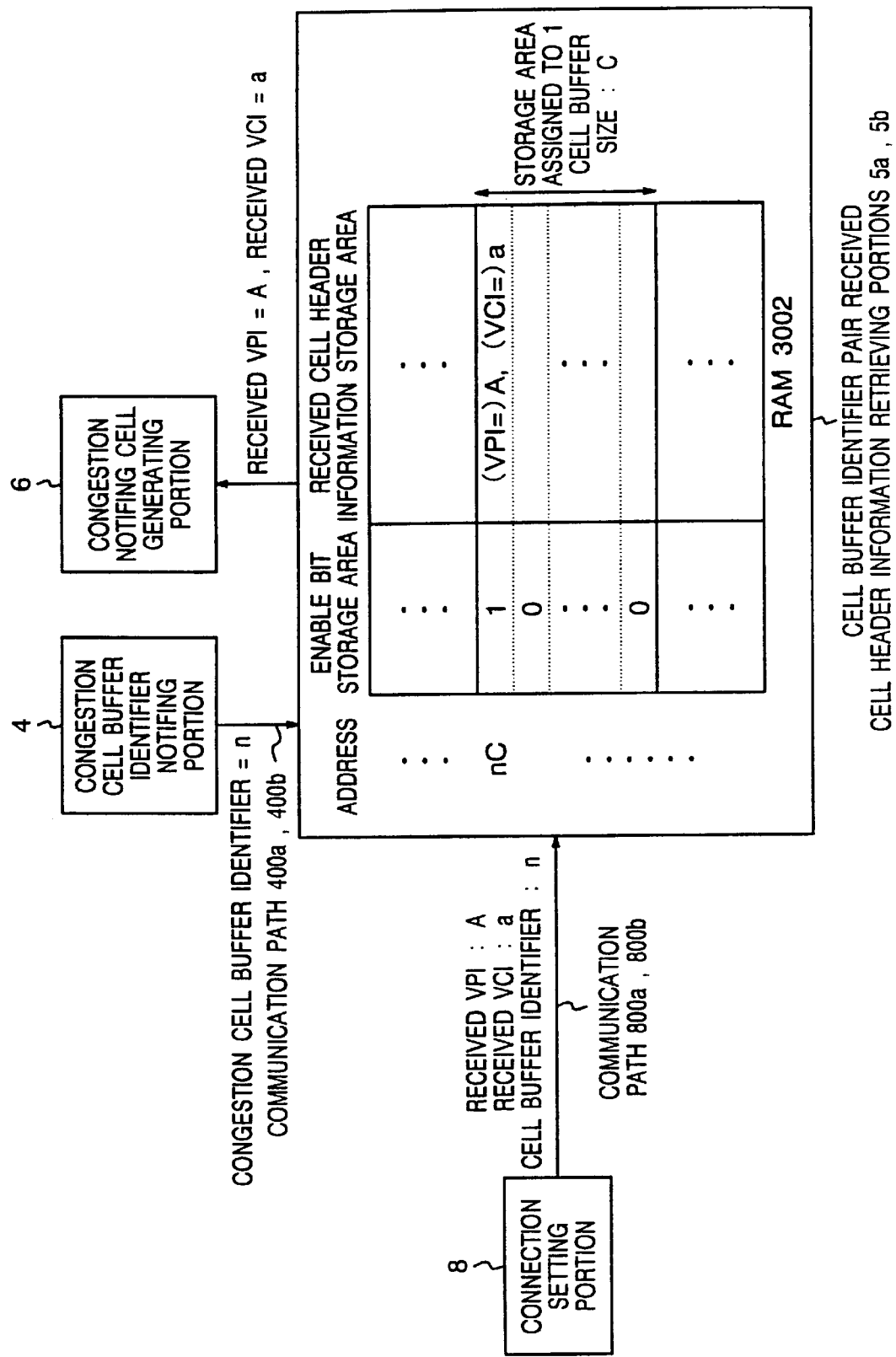
FIG. 10 is a block diagram showing another structure of a cell transmitting origin retrieving portion according to the present invention.

FIG. 10 is a block diagram showing another structure of a cell transmitting origin retrieving portion (a cell buffer identifier pair received cell header information retrieving portion 5) used in an ATM communication apparatus according to the present invention. As against that the table provided in the retrieving portion is constituted of the CAM 2001 and the RAM 3001 in the previous embodiment, the table is constituted only of RAM 3002, and VCI and VPI that have been added at the time of receiving a cell inputted to a cell buffer where a congestion has been generated are retrieved based on the cell buffer identifier similarly to the previous embodiment in the present embodiment. Besides, setting of the table is executed by inputting a cell buffer identifier (routing information 17-1 in the present embodiment) and VPI and VCI of a received cell when the connection setting portion 8 sets a table (not shown) of header converting portions 1a and 1b so as to establish connection in accordance with a direction from a user or a maintenance person similarly to the previous embodiment.

The storage area of the RAM 3002 is divided into two parts, an enable bit storage area and a received cell header information storage area. Then, the address of the RAM 3002 is divided into blocks in the number of cell buffers, and structured so that the size of divided one block becomes the number C of the combinations of VPI and VCI of received cells that can be inputted into one cell buffer. To be concrete, when data of the cell buffer identifier and received VPI and VCI of the cell inputted to the cell buffer shown with the cell buffer identifier are given to this RAM 3002, the values of VPI and VCI of the received cell are stored in the received cell header information storage area using a value obtained by multiplying the value of the cell buffer identifier by C as the address, and a value 1 which shows that VPI and VCI of a received cell stored in the received cell header storage area are effective is stored in the enable bit storage area of the address.

When the cell buffer identifier pair received cell header information retrieving portion 5 provided with a table structured as described above receives a congestion cell buffer identifier from the congestion cell buffer identifier notifying portion 4, in the cell buffer identifier pair received cell header information retrieving portion 5, from an enable bit storage area with a value obtained by multiplying the value of the congestion cell buffer identifier by C as an address to an enable bit storage area with a value obtained by adding (C−1) to an address value as an address is retrieved, and the value stored in the received cell header information storage area of the address that 1 is stored in the enable bit storage area within the scope of retrieval is notified to the congestion notifying RM cell generating portion 6 as VPI and VCI of a received cell inputted to a congestion cell buffer shown with the congestion cell buffer identifier.

Showing with an exemplification, for example, when a user or a maintenance person directs the connection setting portion 8 to establish such connection that header conversion is applied to receiving cells having VPI of A and VCI of a, and exchange is made by distributing them among cell buffers having a cell buffer identifier of n so as to output the cell to the circuit, such information that received VPI=A, VCI=a and cell buffer identifier=n is given from the connection setting portion 8 to the cell buffer identifier pair received cell header information retrieving portions 5a and 5b through communication paths 800a and 800b, and VPI=A and VCI=a are stored in the received cell header information storage area at an address nC, and 1 is stored in the enable bit storage area. Here, when a congestion is generated in a cell buffer having a cell buffer identifier n, notification of a congestion cell buffer identifier=n is made from the congestion cell buffer identifier notifying portion 4, the inside of the enable bit storage area from the address nC to the address C+(C−1) is retrieved in the cell buffer identifier pair received cell header information retrieving portions 5a and 5b, and the data of A and a stored in the received cell header information storage area of the address nC where the value 1 is stored are notified to the congestion notifying RM cell generating portion 6 as VPI and VCI of the received cell inputted to the congestion cell buffer. The operation of the ATM communication apparatus such as generation and transmission of the RM cell after the retrieval of VPI and VCI of a received cell inputted in a congestion cell buffer in the cell buffer identifier pair received cell header information retrieving portions 5a and 5b according to the present embodiment is completed is executed as the embodiment described previously.

Figure 11:
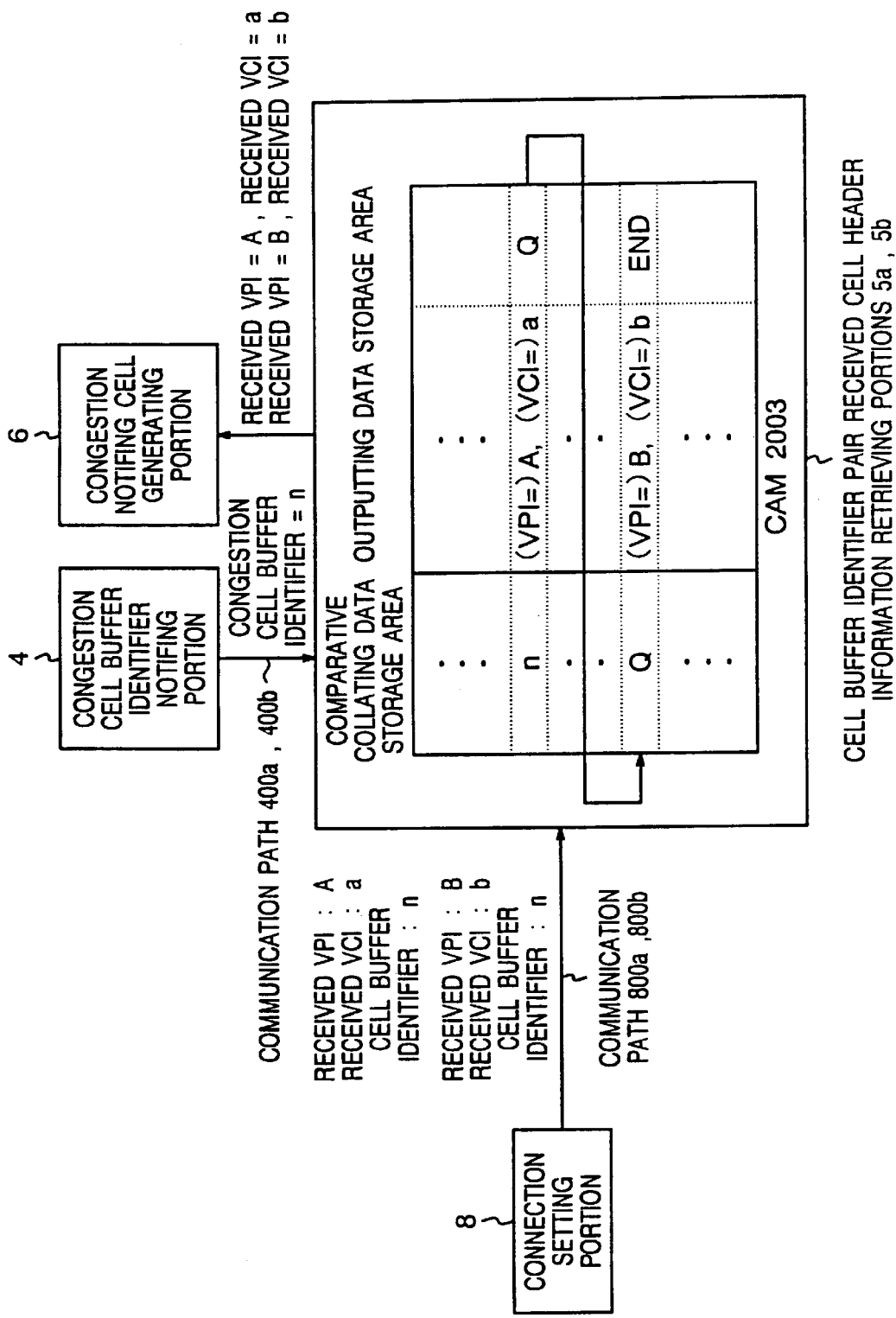
FIG. 11 is a block diagram showing still another structure of a cell transmitting origin retrieving portion according to the present invention.

FIG. 11 is a block diagram showing another structure of a cell transmitting origin retrieving portion (the cell buffer identifier pair received cell header information retrieving portion 5) used in the ATM communication apparatus according to the present invention. In the present embodiment, a table is composed only of the CAM 2003, and VCI and VPI that have been added at the time of receiving a cell inputted in a cell buffer where a congestion has been generated are retrieved based on the cell buffer identifier similarly to the previous embodiment. Besides, the setting of the table is executed by inputting a cell buffer identifier (routing information 17-1 in the present embodiment) and VPI and VCI of the received cell, similarly to the previous embodiment, when the connection setting portion 8 sets a table (not shown) of the header converting portions 1a and 1b so as to establish connection in accordance with the direction from a user or a maintenance person.

The storage area of the CAM 2003 is divided into two parts, a comparative collating data storage area and an outputting data storage area, and the cell buffer identifier is stored in the comparative collating data storage area as comparative collating data, and VPI and VCI of the received cell inputted in the cell buffer shown with the cell buffer identifier are stored in the outputting data storage area.

When the cell buffer identifier pair received cell header information retrieving portions 5a and 5b in which a table has been formed as described above receive a congestion cell buffer. identifier from the congestion cell buffer identifier notifying portion 4, comparative collating data equal to the congestion cell buffer identifier are retrieved, the values of collated outputting data are read as VPI and VCI of a received cell inputted to the cell buffer where a congestion shown with the congestion cell buffer identifier has been generated and are notified to the congestion notifying RM cell generating portion 6.

Showing an exemplification, for example, when a user or a maintenance person directs the connection setting portion 8 to establish such connection that header conversion is applied to a received cell having VPI of A and VCI of a and exchange is made while distributing them among cell buffers of the cell buffer identifier of n so as to output the cell to the circuit, such information that received VPI=A, VCI=a and cell buffer identifier=n is given to the cell buffer identifier pair received cell header information retrieving portions 5a and 5b from the connection setting portion 8 through communication paths 800a and 800b, and n is stored as the comparative collating data of the CAM 2003 and VPI=A and VCI=a are stored as outputting data. Here, when a congestion is generated in a cell buffer having a cell buffer identifier of n, notification of a congestion cell buffer identifier=n is made from the congestion cell buffer identifier notifying portion 4, and a value n is retrieved in the comparative collating data storage area of the cell buffer identifier pair received cell header information retrieving portions 5a and 5b. When the comparative collating data n are detected, the data of A and a stored in the outputting data storage area are notified to the congestion notifying RM cell generating portion 6 as VPI and VCI of the received cell inputted to the congestion cell buffer.

Further, when header conversion is applied also to the received cell of VPI of B and VCI of b, which are inputted to the cell buffer shown with the cell buffer identifier n, i.e., when a plural types of received cells having VPI=A, VCI=a and VPI=B, VCI=b are inputted in one cell buffer, Q which shows comparative collating data of the outputting data storage area where VPI=B and VCI=b are stored is stored first at the end of the outputting data storage area for storing VPI=A and VCI=a with n as comparative collating data at the time of setting a table as shown in FIG. 11. Then, the data of END showing a retrieval complete position are stored at the end of the outputting data storage area where VPI=B and VCI=b are stored.

Here, when a congestion is generated in a cell buffer having a cell buffer identifier of n, comparative collating data n are detected similarly to the operation procedure described above, and the data of A and a stored in the outputting data storage area and Q showing a next retrieving position are read out first. When comparative collating data Q are detected in the comparative collating data storage area in succession, B and b stored in the outputting data storage area and END as the next retrieving position are read. Since the next retrieval position is END, retrieving in the cell buffer identifier pair received cell header information retrieving portions 5a and 5b is completed. Thereafter, VPI=A, VCI=a and VPI=B, VCI=b are notified to the congestion notifying RM cell generating portion 6 as VPI and VCI of the received cell inputted to the congestion cell buffer. With the above, retrieving of VPI and VCI of the received cell inputted to the congestion cell buffer in the cell buffer identifier pair received cell header information retrieving portions 5a and 5b is completed, and the RM cell transmitting operation thereafter is executed as described in the previous embodiment.

According to the present invention, it becomes possible to generate an RM cell added with congestion information immediately in a communication apparatus where a congestion is being generated and transmit the RM cell to a communication terminal or a communication apparatus that is sending out a cell which causes the congestion at the time of congestion in a cell buffer. Thus, it becomes possible for the communication terminal or the communication apparatus to know quickly that the cell buffer is in a congestion state within the network.

Further, since it becomes possible for a communication terminal or a communication apparatus to know quickly that the cell buffer is in a congestion state, the time required from generation of a congestion in a cell buffer until the cell transmission speed is lowered in a communication terminal or a communication apparatus can be reduced, thus making response of congestion control faster.

Furthermore, since it is possible to make response of congestion control faster, the buffer quantity to be prepared in a cell buffer can be reduced.

As described above, according to the present invention, it is possible to provide the service that a communication terminal or a communication apparatus that is sending out a cell which causes the congestion at the time of congestion state of a cell buffer can shorten the response period of time until the cell transmission speed is lowered, and an ATM communication apparatus for realizing the service.

What is claimed is:

1. An asynchronous transfer mode (ATM) communication apparatus forming an ATM communication network, comprising:

a cell buffer portion which temporarily stores cells received from a plurality of cell transmitting origin communication apparatuses and outputs said cells to a destination communication apparatus;

a congestion detecting portion which detects a congestion state of said cell buffer;

a transmitting origin identifying portion which identifies a cell transmitting origin communication apparatus which has input a cell to said cell buffer portion that caused said congestion state from previously registered information in said plurality of cell transmitting origin communication apparatuses based on an output of said congestion detecting portion, wherein said previously registered information being connection information of a connection previously set between said cell transmitting origin communication apparatus and said destination communication apparatus;

a congestion notifying cell generating portion which generates a congestion notifying cell; and an output portion which transmits said congestion notifying cell to said cell transmitting origin communication apparatus identified by said transmitting origin identifying portion at the time of congestion in said cell buffer, wherein said output portion, subsequent to an output from said cell buffer, transmits said congestion notifying cell by inserting said congestion notifying cell into a cell string which is output from said cell buffer and is to be transmitted to said cell transmitting origin communication apparatus.

2. An ATM communication apparatus forming an ATM communication network, comprising:

a switch portion having a cell buffer portion which stores cells temporarily and a congestion detecting portion which detects a congestion state of said cell buffer; and a circuit interface having a transmitting origin identifying portion which identifies a cell transmitting origin communication apparatus, which has input a cell to said cell buffer portion that caused said congestion state, from previously registered information in a plurality of cell transmitting origin communication apparatuses based on an output of said congestion detecting portion, wherein said previously registered information being connection information of a connection previously set between said cell transmitting origin communication apparatus and said destination communication apparatus;

a congestion notifying cell generating portion which generates a congestion notifying cell, and an output portion which transmits said congestion notifying cell to said cell transmitting origin communication apparatus identified by said transmitting origin identifying portion at the time of congestion in said cell buffer, wherein said output portion, subsequent to an output from said cell buffer, transmits said congestion notifying cell by inserting said congestion notifying cell into a cell string which is output from said cell buffer and is to be transmitted to said cell transmitting origin communication apparatus.

3. An ATM communication apparatus connected to an ATM communication network through an interface, comprising:

a plurality of cell buffers which temporarily store cells received from a plurality of cell transmitting origin communication apparatuses and output said cells to a destination communication apparatus;

a congestion detecting portion which detects a congestion state of one of said cell buffers;

a congestion cell buffer identifier notifying portion which notifies an identifier of a cell buffer in which a congestion has been detected by said congestion detecting portion;

a cell transmitting origin identifying portion which identifies a virtual path identifier (VPI) and a virtual channel identifier (VCI) identifying a cell transmitting origin communication apparatus which has input a cell input to said cell buffer that caused said congestion state from previously registered information in said plurality of cell transmitting origin communication apparatuses based on an output of said congestion detecting portion, wherein said previously registered information being connection information of a connection previously set between said cell transmitting origin communication apparatus and said destination communication apparatus;

a congestion notifying cell generating portion which generates a congestion notifying cell having said VPI and VCI of said cell transmitting origin communication apparatus identified by said cell transmitting origin identifying portion as the header; and an output portion which transmits said congestion notifying cell to said cell transmitting origin communication apparatus which has input said cell in said cell buffer that caused said congestion state has been detected, wherein said output portion, subsequent to an output from said cell buffer, transmits said congestion notifying cell by inserting said congestion notifying cell into a cell string which is output from said cell buffer and is to be transmitted to said cell transmitting origin communication apparatus.

4. An ATM communication apparatus according to claim 3, wherein said cell transmitting origin identifying portion stores, within a storage area having identifiers of respective cell buffers of said plurality of cell buffers as the first address, VPI and VCI at the time of receiving a cell input to said cell buffer, identifyies VPI and VCI at the time of receiving a cell input to a cell buffer in a congestion state out of the identifiers of said cell buffer at the time of congestion generation of said cell buffer, and uses the identified VPI and VCI as VPI and VCI of the header of the congestion notifying cell transmitted to a communication apparatus transmitting a cell which causes a congestion.

5. An ATM communication apparatus according to claim 3, wherein said cell transmitting origin identifying portion is provided with a table composed of first and second memories, in which the data for comparative collating of cell buffer identifiers and pointer numbers granted to each of said buffer identifiers being stored in the first memory as the outputting data and VPI and VCI at the time of receiving a cell input to a cell buffer shown with said cell buffer identifier being stored in the second memory with said pointer number as the address, and the identifier of the cell buffer where a congestion is generated at the time of generating the congestion in said cell buffer is input in said table so as to identify VPI and VCI at the time of receiving a cell input to a cell buffer where said congestion has been generated, and said identified VPI and VCI are used as VPI and VCI of the header of said congestion notifying cell for transmitting to the transmitting origin of a cell which causes a congestion.

6. A method of notifying of a congestion of an ATM communication apparatus forming an ATM communication network, comprising the steps of:

detecting a congestion state of a cell buffer for storing cells temporarily;

identifying a cell transmitting origin communication apparatus which has input a cell to said cell buffer that caused said congestion state from previously registered information in a plurality of cell transmitting origin communication apparatuses based on said congestion detecting step, wherein said previously registered information being connection information of a connection previously set between said cell transmitting origin communication apparatus and a destination communication apparatus;

generating a congestion notifying cell; and transmitting said congestion notifying cell to said cell transmitting origin communication apparatus identified by said identifying step, wherein said congestion notifying cell, subsequent to an output from said cell buffer is transmitted by inserting said congestion notifying cell into a cell string which is output from said cell buffer and is to be transmitted to said cell transmitting origin communication apparatus.

7. A method of notifying of a congestion of an ATM communication apparatus connected to an ATM communication network through an interface, comprising the steps of:

detecting respective congestion states of a plurality of cell buffers;

notifying an identifier of a cell buffer in which a congestion has been detected;

identifying a virtual path identifier (VPI) and a virtual channel identifier (VCI) corresponding to a cell transmitting origin communication apparatus which has input a cell to said cell buffer that caused said congestion state from previously registered information in a plurality of cell transmitting origin communication apparatuses based on said congestion detecting step, wherein said previously registered information being connection information of a connection previously set between said cell transmitting origin communication apparatus and a destination communication apparatus;

generating a congestion notifying cell having said VPI and VCI in the header; and transmitting said congestion notifying cell to said cell transmitting origin communication apparatus which has input said cell to said cell buffer that caused said congestion state, wherein said congestion notifying cell, subsequent to an output from said cell buffer, is transmitted by inserting said congestion notifying cell into a cell string which is output from said cell buffer and is to be transmitted to said cell transmitting origin communication apparatus.

8. An ATM communication network composed of a plurality of ATM communication apparatuses and provided with congestion control function, each of said ATM communication apparatuses comprising:

a cell buffer portion which temporarily stores cells received from a plurality of cell transmitting origin communication apparatuses and outputs said cells to a destination communication apparatus;

a congestion detecting portion which detects a congestion state of said cell buffer;

a transmitting origin identifying portion which identifies a cell transmitting origin communication apparatus that has input a cell in said cell buffer portion that caused said congestion state from previously registered information in said plurality of cell transmitting origin communication apparatuses based on an output of said congestion detecting portion, wherein said previously registered information being connection information of a connection previously set between said cell transmitting origin communication apparatus and said destination communication apparatus;

a congestion notifying cell generating portion which generates a congestion notifying cell;

an output portion which transmits said congestion notifying cell to said cell transmitting origin communication apparatus identified by said transmitting origin identifying portion at the time of congestion of said cell buffer, wherein said output portion, subsequent to an output from said cell buffer, transmits said congestion notifying cell by inserting said congestion notifying cell into a cell string which is output from said cell buffer and is to be transmitted to said communication apparatus; and a cell transmission speed control portion, that, when a congestion is detected in a cell buffer of an optional cell transmitting origin communication apparatus of said cell transmitting origin communication network, said communication apparatus identifies another cell transmitting origin communication apparatus which has input a cell to a cell buffer where said congestion has been generated and transmits a congestion notifying cell generated in said cell transmitting origin communication apparatus to said another cell transmitting origin communication apparatus, and that said another communication apparatus reduces a cell transmission speed lower when said congestion notifying cell is received, thereby evading a congestion state.

9. A method of controlling a congestion in an ATM communication network composed of a plurality of ATM communication apparatus, wherein each of said ATM communication apparatus performs the steps of:

detecting a congestion state of a cell buffer for storing cells temporarily;

identifying a cell transmitting origin communication apparatus which has input a cell to said cell buffer that caused said congestion state from previously registered information in said plurality of cell transmitting origin communication apparatuses based on said congestion detecting step, wherein said previously registered information being connection information of a connection previously set between said cell transmitting origin communication apparatus and a destination communication apparatus;

generating a congestion notifying cell;

transmitting said congestion notifying cell to said cell transmitting origin communication apparatus identified by said identifying step; and receiving said congestion notifying cell and controlling a cell transmission speed, wherein another cell transmitting origin communication apparatus which has input a cell to a cell buffer where a congestion has been generated at the time of detection of the congestion in the cell buffer of a cell transmitting origin communication apparatus is identified and the congestion notifying cell is transmitted to said identified another cell transmitting origin communication apparatus, wherein said another cell transmitting communication apparatus reduces the cell transmission speed lower so as to evade a congestion state when said congestion notifying cell is received, and wherein said congestion notifying cell is transmitted by inserting said congestion notifying cell into a cell string which is output from said cell buffer and is to be transmitted to said cell transmitting origin communication apparatus.

* * * * *